May 12, 1959 D. S. TAYLOR ET AL 2,886,461
ANHYDROUS CRYSTALLINE BORATE AND PROCESS FOR PRODUCING SAME
Filed May 23, 1955 2 Sheets-Sheet 1

DONALD S. TAYLOR,
NELSON P. NIES,
INVENTORS.

BY *[signature]*

ATTORNEYS.

DONALD S. TAYLOR,
NELSON P. NIES,
INVENTORS.

United States Patent Office 2,886,461
Patented May 12, 1959

2,886,461
ANHYDROUS CRYSTALLINE BORATE AND PROCESS FOR PRODUCING SAME

Donald S. Taylor, Long Beach, and Nelson P. Nies, Altadena, Calif., assignors, by mesne assignments, to United States Borax & Chemical Corporation Application May 23, 1955, Serial No. 510,130

2 Claims. (Cl. 106—316)

This invention is concerned with the production of a sodium borate composition having particularly useful properties. Among those properties are a relatively high percentage content of $B_2O_3$, a relatively low percentage content of $Na_2O$ and unusually little tendency to absorb moisture from the atmosphere.

Many industrial processes, of which glass making is illustrative, a require appreciable quantities of $B_2O_3$ as an ingredient in a composition that is to be melted at relatively high temperature in a furnace. Such requirements may be supplied theoretically by many different sodium borates, or by boric acid. The latter compound has the advantage of providing $B_2O_3$ without any $Na_2O$. However, it has the disadvantage of relatively high water content, roughly 43%. Percentages throughout the present specification are expressed on a weight basis. Removal of that water in the furnace may be objectionable, and the shipping charges on the useless water may be an appreciable obstacle. Moreover, boric acid is rather volatile, tending to plug furnace flues and cause other serious difficulties.

The nomenclature of the sodium borates as here used is that recommended by the International Union of Chemistry, based upon the molar ratio $Na_2O:B_2O_3$ in the various salts. Thus:

Sodium 1,2-borate is $Na_2O \cdot 2B_2O_3$, or $Na_2B_4O_7$;
Sodium 1,3-borate is $Na_2O \cdot 3B_2O_3$, or $NaB_3O_5$;
Sodium 1,4-borate is $Na_2O \cdot 4B_2O_3$ or $Na_2B_8O_{13}$;
Sodium 1,5-borate is $Na_2O \cdot 5B_2O_3$, or $NaB_5O_8$.

Ordinary borax, $Na_2B_4O_7 \cdot 10H_2O$, is sodium 1,2-borate with ten molecules of water of crystallization; and calcined borax is sodium 1,2-borate with less than 10, usually 2 to 3, molecules of water.

Various sodium borates have been used for such purposes as glass making. Anhydrous sodium 1,2-borate ($Na_2B_4O_7$), for example, has the advantage of low initial water content. However, as a source of $B_2O_3$ it has the disadvantage of a relatively high content of $Na_2O$ (more than 30%). Sodium 1,5-borate may be prepared as an anhydrous glassy material, but it is highly hygroscopic, so that careful packing and handling are necessary to maintain a definite formula composition. If the amount of water is not uniform at the point of use, expensive laboratory control may be necessary in formulating compositions. Anhydrous boric oxide is also highly hygroscopic, particularly in its crystalline form.

An important object of the present invention is to permit the economical production of an anhydrous borate product having improved characteristics for uses in which high $B_2O_3$ content and low water content are desired, such, for example, as glass making. A further object of the invention is the production of a suitable composition for use as raw material in making such a composition, whereby the process of production may be facilitated and the production cost reduced.

It has been discovered that it is possible to produce on a commercial scale and at reasonable expense a sodium borate product that has a relatively high percentage content of $B_2O_3$ (more than 80%) and that is not only initially free of bound water but also remarkably resistant to absorption of water from the atmosphere. That composition consists in large part of anhydrous crystalline sodium 1,4-borate ($Na_2O \cdot 4B_2O_3$), which appears to have been produced previously only on a laboratory scale.

In the laboratory, anhydrous crystalline sodium 1,4-borate has been crystallized in a furnace under controlled temperature. That type of crystallization is entirely impracticable for useful production on a commercial scale. It has been found that crystalline sodium 1,4-borate can be produced rapidly on a commercial scale by pouring from a furnace at molten temperature a mass of sodium borate having the composition of the 1,4-borate into a mold having a volume not less than about one third of a cubic foot, and shaped to give as large a ratio of volume to surface as is practicable. For example, a generally rectangular mold 12 inches long, 8 inches wide and 6 inches deep contains approximately one third of a cubic foot. A hemispheric mold of 6¼ inch radius also contains approximately one third of a cubic foot. The natural cooling of such a filled mold is appreciably slowed by the heat released on crystallization of the borate, and the resultant rate of cooling is such that crystallization goes substantially to completion without any expensive and cumbersome annealing operation. A relatively thin surface layer of the mass ordinarily forms a glassy solid. However, the volume of such non-crystalline material is a small fraction of the whole, so that the entire composition is substantially wholly crystalline.

A further important aspect of the invention is the discovery of particularly effective types of furnace feed material having suitable physical properties and also having a molar ratio of $B_2O_3/Na_2O$ of the required value. The theoretical value of that ratio for sodium 1,4-borate is, of course, 4. The term "molar ratio" throughout the present specification and claims means the molar ratio of $B_2O_3/Na_2O$, unless a different meaning is clear from the context. It has been found advantageous to employ a furnace feed composion having an average molar ratio lower than the theoretical value of 4.0. A further aspect of the invention is the discovery that it is highly desirable to employ, as furnace feed, compositions having less water of hydration than is normally present at room temperature. It has been found, in particular, that borate compositions consisting essentially of sodium 1,5-borate and a borate of molar ratio less than 4 are particularly favorable as furnace feed materials.

A further object of the invention is the provision of procedures by which sodium 1,5-borate compositions of the type required can be produced particularly conveniently and economically. Closely related procedures can be employed alternatively for the production of sodium 1,5-borate for other purposes.

An important practical problem in carrying out the crystallization of sodium 1,4-borate is the difficulty of providing a satisfactory feed material for the furnace, particularly for continuous, rather than batch, operation. In particular, it is difficult in practice to maintain the several ingredients used as furnace feed in strictly uniform and correct proportions to lead consistently to a furnace melt having a molar ratio accurately equal to 4.0. Any departure from that theoretical value would be expected to inhibit the process of crystallization, so that cooling of the melt at a uniform rate sufficiently rapid to be practicable would lead to a product consisting substantially wholly of crystal only in those pourings for which the theoretical ratio was accurately met, and containing an increasing amount of glassy material whenever the molar ratio of the melt departed appreciably from that ratio.

It has been discovered that such is indeed the case when the molar ratio is allowed to reach values above the theoretical value of 4.0. For example, at a ratio of 4.1 the crystallization is significantly affected, and at a ratio of 4.2 it is severely inhibited. It is therefore difficut to maintain satisfactory operation on a continuous basis at an average ratio of 4.0 unless the proportions of the ingredients are maintained uniform within a strictly controlled range.

However, it has been discovered further that it is possible to utilize effectively a $B_2O_3$ to $Na_2O$ molar ratio appreciably less than 4.0 without interfering with effective and prompt crystallization. For example, crystallization has been found to proceed without noticeable difference at ratios within the range between 3.7 and 4.0. And melts having a ratio as low as 3.6 and even 3.5 have been crystallized satisfactorily. That surprising discovery is utilized in accordance with the present invention by employing preferably as furnace feed a composition yielding an average molar ratio substantially midway of the range between 3.7 and 4.0. Normal variations encountered in the molar ratio of the actual furnace melt, due either to variations in composition of the individual ingredients, or to other causes, then produce no harmful effect upon the operation of the system and require no expensive monitoring by laboratory analysis or other means aimed at completely eliminating or compensating such variations. The resulting composition is an anhydrous, substantially crystalline sodium borate, which is believed to comprise a mixture of crystals of sodium 1,4-borate and of sodium 1,3-borate ($Na_2O \cdot 3B_2O_3$). The possibility of economical and rapid commercial production of such a crystalline sodium borate is an important aspect of the invention.

It has been discovered further than anhydrous crystalline sodium borate compositions of the type described are distinctly less hygroscopic than other compositions containing comparable percentages of $B_2O_3$. In particular, the crystalline materials of the invention are less hygroscopic than the glassy borate materials of corresponding composition. That is surprising, since the opposite is true for both anhydrous sodium 1,2-borate and anhydrous boric oxide ($B_2O_3$). Moreover, anhydrous boric oxide, whether glassy or crystalline, is so hygroscopic as to be inconvenient or even impractical for many commercial purposes. The compositions of the present invention, on the other hand, offer a highly useful combination of relatively high content of $B_2O_3$ (more than 80%) and relatively low hygroscopicity.

A full understanding of the invention and of its further objects and advantages will be had from the following description of certain illustrative manners of carrying it out. That description, of which the accompanying drawings form a part, is intended only as illustration, and not as a limitation upon the scope of the invention, which is defined in the appended claims.

*Furnace operation*

Figure 1:
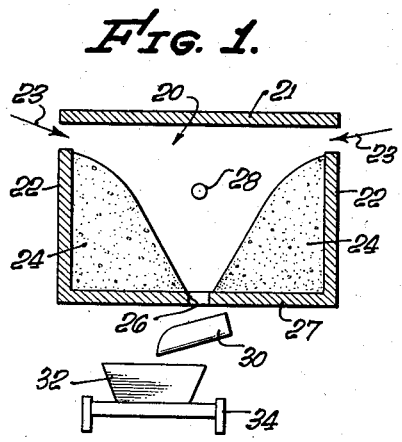
Fig. 1 is a schematic vertical section representing an illustrative furnace such as may be used for producing anhydrous sodium borate.

In accordance with one embodiment of the invention, crystalline anhydrous sodium borate of the type described may be produced from a furnace melt that comprises as raw material a mixture of boric acid and a form of sodium 1,2-borate having less than the normal water content of 10 mols $H_2O$ per mol of sodium 1,2-borate. Such a melt may be formed, for example, in a furnace of the type indicated partly schematically in Fig. 1. A furnace enclosure 20 comprises side walls 22, floor 27 and ceiling 21. The feed material may be introduced by any suitable conveyor and distributing means, not shown, at the top of the furnace side walls 22, as indicated by the arrows 23, and forms a bank 24 of solid material surrounding the furnace outlet, indicated at 26 in the floor 27 of the furnace enclosure. The slanting face of bank 24 is exposed directly to heat from an open flame within the furnace enclosure. That flame is typically produced by combustion of natural or artifical gas at a burner, indicated schematically at 28. Feed material is therefore continuously melted at the exposed face of bank 24, and flows down the sloping surface of the bank to furnace outlet 26. That outlet may be designed and operated in known manner to regulate within limits the temperature at which the melt is delivered from the furnace. That delivery is typically directed, as by the spout 30, to a series of relatively deep tray-like molds 32, which may be moved under the spout on any suitable conveying means, indicated at 34. In a furnace of that type the feed material typically remains solid at the upper portion of the sloping banks 24, being gradually heated as it moves down the banks, and starting to melt only after it has moved down the slope a considerable distance. It is therefore desirable that the feed comprise a composition that remains free-flowing during that initial heating stage.

If the feed material initially contains an excessive amount of water it is found that it may, under extreme conditions, become so fluid upon heating as to run down the furnace banks without becoming dehydrated. With more moderate excess of water, the feed material tends to form lumps and balls as the water is released with increasing temperature, impeding the free flow of the material down the furnace banks. That difficulty may be greatly reduced by utilizing a furnace feed having reduced water content.

*Furnace feed: Boric acid and calcined borax*

Figure 2:
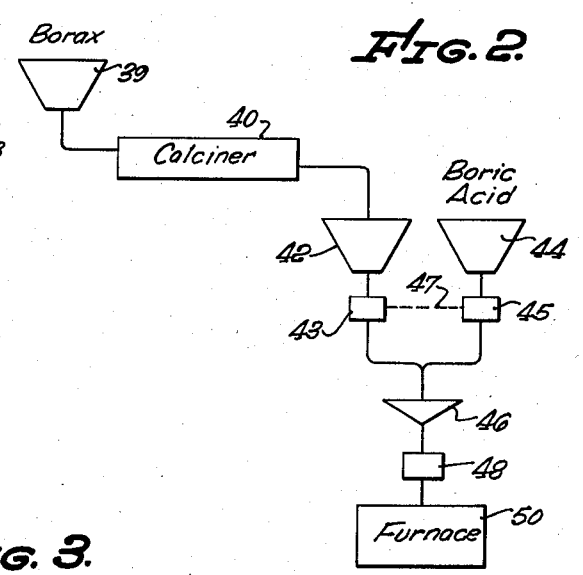
Fig. 2 is a schematic drawing representing an illustrative system in accordance with the invention.

Such a furnace feed may comprise, for example, a mixture of boric acid and calcined borax. Fig. 2 represents in schematic form an illustrative system for providing such a furnace feed. Borax is delivered from a storage bin 39 to a suitable dehydrator, which is indicated at 40 as a conventional calciner. In actual practice any suitable type of dehydrating means may be employed, and the numeral 40 may, for example, represent a series of individual calciners, or any other known means of removing a large proportion of the water of crystallization of the borax. Calcined borax is delivered to surge bin 42 from dehydrator 40 preferably with a water content between 1 and 2 mols of water per mol of sodium 1,2-borate. The calcined borax is supplied via a suitable metering device, indicated schematically at 43, to the dry mixer 46. Boric acid from a storage bin 44 is similarly supplied via the metering device 45 to dry mixer 46. The two metering devices are regulated in suitable mutual relation, as indicated by the dashed line 47, to supply calcined borax and boric acid to the dry mixer in a predetermined proportion. The proportion of those ingredients is so determined, taking account of the average water content of the calcined borax produced by dehydrator 40, as to yield a mixture at the outlet of mixer 46 that has the desired average molar ratio. For example, if the borax is calcined to a water content of 1 mol, equal parts by weight of the calcined borax and boric acid provide a composition having an overall molar ratio of approximately 3.77; while the same proportions yield a molar ratio of about 3.92 if the calcined borax contains 2 mols of water. The mixture from mixer 46 is then supplied via any suitable conveying and metering means 48 to the furnace, indicated at 50.

By proportioning the boric acid and calcined borax to yield a molar ratio equal to about 3.85, for example, on the basis of the average water content of the calcined borax, such small irregularities in that water content as normally occur in calcined borax need not be constantly monitored by laboratory analysis and compensated by adjustment of the proportions of the two ingredients. Although such normal irregularities in water content may lead to corresponding variations in ratio of boric acid to anhydrous sodium 1,2-borate in the actual mixture produced, thus causing slight variations in the molar ratio of the furnace feed, that ratio will ordinarily remain within the preferred range between about 3.7 and 4.0, and will therefore not disturb proper operation of the process. In that manner it has been found to be possible to produce economically a very satisfactory product from an initial furnace feed comprising a simple mixture of boric acid and calcined borax.

*Furnace feed: Boric acid and sodium, 1,2-borate pentahydrate*

Alternatively, the calcined borax at bin 42 may be replaced by crystalline sodium 1,2-borate pentahydrate. Such use of pentahydrate and boric acid has the advantage that both components of the mixture are definite crystals of uniform composition. For example, a mixture of one part sodium 1,2-borate pentahydrate and 0.807 part boric acid by weight leads conveniently to a uniformly reproducible furnace feed having molar ratio $B_2O_3/Na_2O$ of approximately 3.90, which is within the preferred range. Furnace feed of that illustrative type contains substantially 36.6% water. That figure, although it is very appreciably less than the 45.8% water content of a corresponding mixture of boric acid and ordinary borax, is high enough to require careful and continuous control of the rate of supply of the feed material to the furnace at such a value that the material moves uniformly down the furnace banks and becomes fully dehydrated before reaching the furnace outlet. It is found preferable under most conditions of operation to employ a furnace feed composition containing less than about 30% water, such, for example, as a mixture of boric acid and calcined borax containing less than 2 mols of water per mol of sodium 1,2-borate.

*Hygroscopicity of product*

Figure 3:
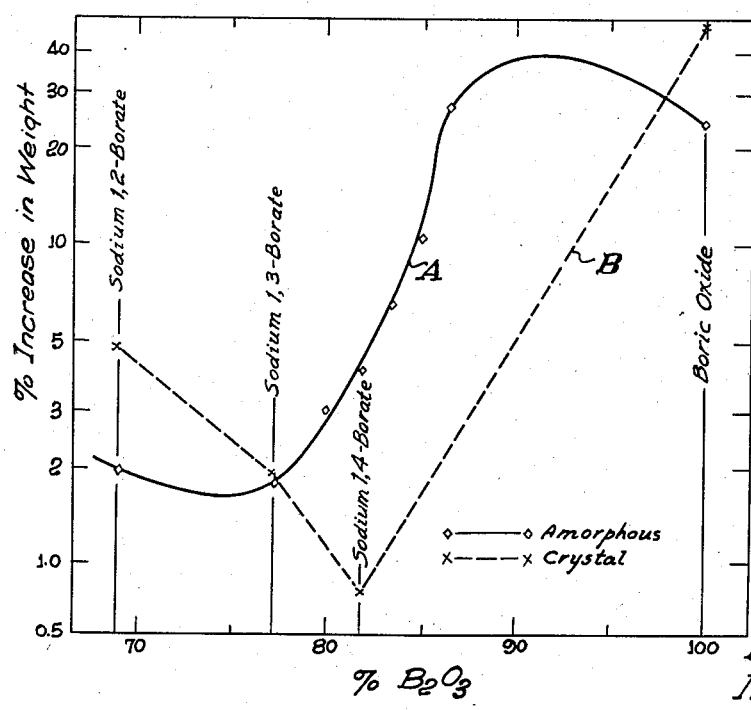
Fig. 3 is a graph, representing the relative hygroscopicity of certain compositions plotted against percentage $B_2O_3$.

The resulting anhydrous and substantially crystalline product is friable and can readily be crushed to convenient granular form. The superior properties of the product with respect to absorption of water from the atmosphere are illustrated in Fig. 3. In that figure are plotted experimental data obtained for a variety of anhydrous sodium borates and for boric oxide, including both crystalline and glassy materials. The percentage content by weight of $B_2O_3$ is plotted as abscissa. The ordinates are plotted on a logarithmic scale and represent the percentage increase in weight of samples of the indicated materials when exposed to an atmosphere of approximately 52% relative humidity at room temperature for a period of ten days. All materials were in granular form of a screen size to pass a 35 mesh Tyler screen and to be held on a 48 mesh screen.

The sharp increase of hygroscopicity with $B_2O_3$ content in the non-crystalline sodium borate materials throughout the range between 77.1% $B_2O_3$ (anhydrous sodium 1,3-borate) and about 86.5% $B_2O_3$ is clearly shown by curve A of Fig. 3. The amounts of water picked up by crystalline anhydrous sodium 1,2-borate and by crystalline anhydrous boric oxide (at left and right extremes of curve B) are more than double the amounts for the corresponding glassy materials. However, that relation is sharply and surprisingly inverted for anhydrous sodium 1,4-borate. That material in the form of crystal picks up only about one fifth as much moisture from the atmosphere as the corresponding glass under the typical test conditions. In the case of sodium triborate, the crystalline and glassy materials show substantially equal hygroscopicities.

*Molar ratio of $B_2O_3/Na_2O$*

The present invention not only utilizes the newly discovered low hygroscopicity of anhydrous crystalline sodium 1,4-borate, the unexpected nature of which is clearly illustrated in Fig. 3, but further makes use in a novel manner of the sharp dependence upon $B_2O_3$ content of the hygroscopicity of glassy anhydrous sodium borates. By working in the range of $B_2O_3$ content that corresponds to a molar ratio between about 3.7 and 4.0, the invention makes practical use of that relationship in the following way. As a melt having molar ratio in that range cools under the conditions already described, $Na_2O \cdot 4B_2O_3$ crystallizes and is removed from the liquid phase of the melt. The molar ratio of the remaining melt is therefore shifted progressively further away from the value (4.0) of the crystal formed. Any relatively small portion of that remaining melt that may ultimately form glassy rather than crystalline portions of the final integrated solid therefore necessarily has a molar ratio appreciably less than 4.0. Because of the sharp slope of curve A in Fig. 3, such glassy portions can at most contribute only a relatively small amount to the hygroscopicity of the overall integrated composition. For instance, with an initial furnace melt having the preferred molar ratio 3.85, and assuming, as a rather extreme example, that on cooling of such a melt only 85% of its $B_2O_3$ crystallizes as $Na_2O \cdot 4B_2O_3$, the remainder of the composition would have an average molar ratio of 3.19 and a corresponding percentage $B_2O_3$ content of 78.2%. That substantially corresponds to the composition of anhydrous sodium 1,3-borate, tending to facilitate crystallization of that substance. However, even if all of that remainder should form glass, it may be seen from Fig. 3 that the tendency of that fraction of the final physically integrated composition to absorb moisture would be only about one half as great as would be the case if 15% of a composition of molar ratio 4.0 should fail to crystallize.

Moreover, a composition having a nominal molar ratio of 4.0 is likely, as has already been indicated, to include portions for which the ratio has a value appreciably above 4.0. Any such portions of a furnace melt produce upon cooling a mixture of crystalline 1,4-borate and a glassy material for which the molar ratio is markedly displaced upward from 4.0. Such glassy material, as may be seen from Fig. 3, has a relatively great tendency to absorb water from the atmosphere. Glassy material of that type is effectively avoided in accordance with the present invention, and the water absorption of any glass that may form is held to a minimum value, by maintaining the average molar ratio of the furnace feed less than 4.0 and preferably within the range between 4.0 and about 3.7.

*Elimination of boric acid*

It has been discovered further, that, whereas satisfactory results are obtainable with feed compositions of the type already described, it is preferable from the point of view of economical and uniform feeding and operation of the furnace, that the furnace feed be substantially free of boric acid. That is perhaps partly because of the relatively high water content of boric acid, but even partially or wholly dehydrated boric acid has been found to have a tendency to promote lumping of the feed on the upper part of the furnace slopes. It has been found that superior behavior is obtainable by utilizing as feed a composition consisting essentially of sodium 1,5-borate, either crystalline or partially or wholly dehydrated, and a sufficient quantity of a sodium borate having a $B_2O_3/Na_2O$ ratio less than 4 to provide the desired overall ratio of the composition. A preferred sodium borate for that latter purpose is sodium 1,2-borate. For example, a suitable feed composition in accordance with the present aspect of the invention comprises sodium 1,5-borate and sodium 1,2-borate in a ratio of 2 mols 1,5-borate to approximately 1 mol 1,2-borate. For a given total water content, a composition of that type, for example, gives appreciably better performance in the furnace than a corresponding mixture of boric acid and sodium 1,2-borate.

Reaction of borax and boric acid in calciner

Figure 4:
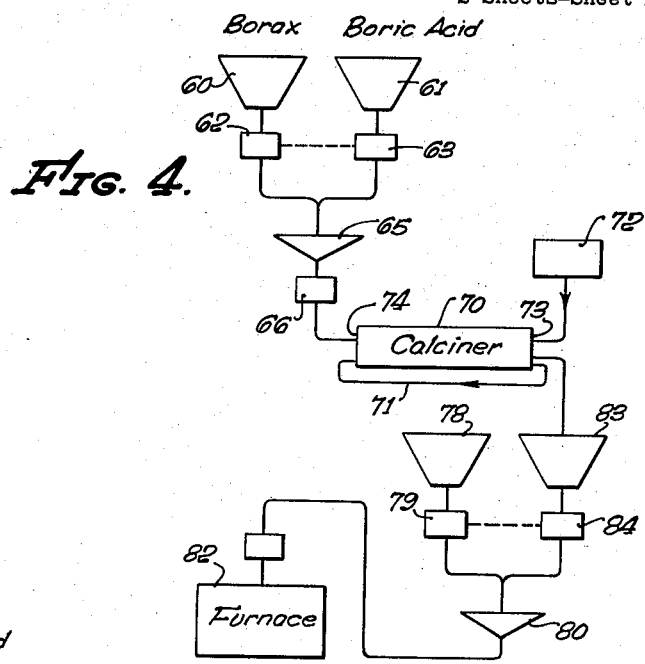
Fig. 4 is a schematic drawing representing a modified illustrative system in accordance with the invention.

A further aspect of the present invention has to do with procedures for producing a furnace-feed material of the type just described in a particularly economical and convenient manner. Fig. 4 illustrates schematically a typical system for carrying out one illustrative procedure of that type. Borax and boric acid are delivered from respective bins 60 and 61 in a definite proportion controlled, for example, by the metering devices 62 and 63, respectively. In preferred form of the invention, the ratio of those ingredients is so determined as to provide substantially 6 mols of boric acid per mol of sodium 1,2-borate, giving an overall molar ratio $B_2O_3/Na_2O$ of approximately 5, corresponding to the composition of sodium 1,5-borate. Alternatively, a larger proportion of borax may be used, as will be described below. Those ingredients are thoroughly mixed, as at 65, and are supplied at a controlled and relatively low rate of flow, as via the metering device 66, to a calciner, indicated schematically at 70. That calciner is supplied, by means indicated at 72, with a stream of air of accurately controllable volume and temperature. That air moves through the calciner in countercurrent flow with respect to the described feed mixture, entering at the discharge end 73 of the calciner at moderate temperature, and leaving at the feed end 74 of the calciner at relatively low temperature.

Calciner 70 is operated at relatively low temperature throughout, and particularly in the vicinity of the feed end. As an illustration, air may enter at 73 at a temperature of 200 to 300° F., and preferably leaves the calciner at 74 at a temperature within the range between about 85 and about 100° F. A relatively large volume of air is employed, approximating 200 cu. ft. per pound of material processed, that large volume making up for the relatively low moisture-carrying capacity of the air at the temperatures indicated.

Under the conditions described in the vicinity of the feed end of the calciner, it has been found that chemical reaction of the borax and boric acid to form sodium 1,5-borate can be readily initiated, and ordinarily is so initiated spontaneously. That reaction, as is well known, releases water in a theoretical amount of 9 mols $H_2O$ per mol of 1,5-borate formed. If allowed to continue in a closed vessel, for example, that released water typically leads to a slurry, or even a solution, depending upon the temperature. An important feature of the present invention is that the conditions are so controlled that the reaction proceeds at a moderate rate, and that a large fraction of the released water is evaporated as it is released. That is accomplished primarily by providing a relatively rapid flow of air at a moderately low temperature. The volume of air is limited sufficiently that a controlled amount of released water is permitted to accumulate, sufficient to make the entire granular mixture superficially damp. That superficial dampness is an important feature of the process, since it promotes the described chemical reaction. The rate of evaporation, on the one hand, must be sufficient to avoid too great wetness of the material which would tend to produce excessive agglomeration or balling of the material, reducing its effective surface area and further slowing evaporation. On the other hand, the rate of evaporation must not be too great, for the mixture then may become so dry as to slow down the chemical formation of 1,5-borate. That would reduce the rate of release of water, and so tend further to increase the dryness.

The operation is thus carried out under conditions that are not inherently stable, but that tend, once they have been altered in either direction, to change further in that same direction. It has been found, however, that by careful control, particularly of the volume of air flow through the calciner, it is possible to maintain satisfactorily uniform conditions of operation. Those conditions, as already indicated, are such that the transformation of borax and boric acid to sodium 1,5-borate takes place gradually as the material moves through a damp zone of appreciable length, the released water being evaporated at such a rate as to maintain throughout that zone a condition of moderate superficial dampness. Moreover, as the material progresses through that damp zone the temperature of the air that it encounters, and also the temperature of the material itself, gradually increases. For example, the transformation to 1,5-borate typically starts in the immediate vicinity of the feed end of the calciner at a temperature of less than 100° F. and is not fully completed until the material has passed a considerable distance along the calciner, where it is exposed to air at a temperature of 120 to 150° F., for example. That higher temperature tends to insure complete reaction.

After the reaction has reached substantial completion, the surfaces of the sodium 1,5-borate particles become dry. The 1,5-borate may then be delivered from the calciner in surface-dry condition and still containing substantially the normal 10 mols of water per mol of 1,5-borate. Alternatively and preferably the calciner is of such length that the surface-dry 1,5-borate is retained in the calciner for a sufficient time to become calcined, losing a large fraction or even substantially all of its water of crystallization. In the preferred form of the invention, the moist zone in which the chemical reaction primarily occurs occupies roughly one-half of the length of the calciner, while the remainder of that length provides a zone of considerably higher temperature in which the dry 1,5-borate is calcined. At the discharge end of the calciner the 1,5-borate is typically exposed to air at a temperature of 200 to 300° F., for example, which is sufficient to reduce the remaining water content of the 1,5-borate to as little as 2 to 4 mols. Alternatively, temperatures higher than 300° F. may be employed for the last portion of the described operation. That is particularly convenient if the damp phase and the calcining phase of the operation are provided with separate air streams that are subject to independent control, as may be accomplished, for example, by the use of separate calciners for the two phases of the process. By the use of air temperatures in the neighborhood of 600° F. the finally delivered material may then be dried substantially completely, typically containing as little as 1% water, or about 0.25 mol $H_2O$ per mol 1,5-borate.

The product of that described operation is substantially sodium 1,5-borate, preferably considerably dehydrated. That product may be delivered via a surge bin 83 and metering device 84 to a dry mixer 80, to which is also supplied at an appropriate rate a sodium borate having molar ratio less than 4. As typically illustrated in Fig. 4, ordinary calcined borax is supplied from a storage bin 78 via a metering device 79, the proportion of borax to 1,5-borate being determined in accordance with their particular compositions to yield a composition in mixer 80 having an average molar ratio preferably somewhat less than 4.0 for the reasons already discussed. That mixture, typically comprising from about 1.3 to about 1.9 mols of sodium 1,5-borate per mol of sodium 1,2-borate, may then be supplied as feed material to the furnace, indicated schematically at 82.

Direct production of furnace feed in calciner

An alternative manner of operating a system of the above described type includes supplying the borax and boric acid to mixer 65 in a proportion to yield a composition having substantially the molar ratio desired for the furnace feed itself, preferably between about 3.7 and 4.0. That range of molar ratios corresponds to a mixture of borax and boric acid containing between 1.5 and about 1.8 mols of sodium 1,2-borate per 6 mols of boric acid, or between 0.5 and 0.8 mols excess over the 1.0 mol of 1,2-borate required to react with 6 mols of boric acid. The operation then proceeds substantially as already described, except that in calciner 70 there is an excess of borax beyond that required to react with all the boric acid. Bin 78, metering device 79 and dry mixer 80 may then be omitted, the calcined product from surge bin 83 being supplied directly via metering means 84 to the furnace. Under that manner of operation all of the boric acid is typically converted to sodium 1,5-borate in the damp phase of the operation, while from 33 to about 44% of the initial borax remains unreacted. During the calcining phase, both the remaining borax and the 1,5-borate produced by the reaction are dried to respective degrees dependent upon the particular conditions employed. A particular advantage of that manner of operation is that the mixture of borax and sodium 1,5-borate behaves particularly well during calcining, and can be made virtually completely anhydrous without difficulty. A further advantage of mixing borax and boric acid initially in the proportion required to give the final furnace feed is that the composition of both borax and boric acid is substantially uniform, and it is unnecessary to vary the weight ratio in which they are combined to compensate for variations in composition of the ingredients.

In a process of the type described in which sodium 1,5-borate is produced under conditions of only superficial dampness, it is found advantageous, although not necessarily essential, to provide more or less continuous seeding with crystals of 1,5-borate. That may ordinarily be accomplished to a sufficient extent when the operation is carried out, as illustratively described, in a calciner with counter-current air flow, since fine crystals of 1,5-borate formed by the process tend to be carried by the air stream toward the feed end of the calciner, where they act as seed crystals. Alternatively, a definite amount of the product may be removed from the calcining zone of the operation and recycled through the damp reaction zone. Such recycling of a portion of the product is indicated schematically at 71 in Fig. 4. That not only promotes the reaction, but facilitates removal of the released water.

*Reaction of borax and boric acid as a slurry*

Figure 5:
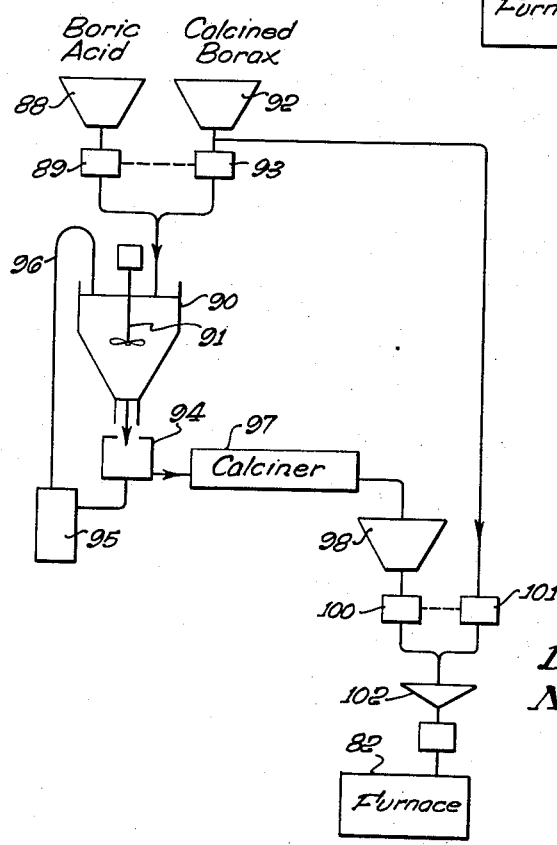
Fig. 5 is a schematic drawing representing a further modification.

A further modification of the invention is illustrated in Fig. 5. In the system there shown illustratively, boric acid and a suitable borate such as sodium 1,2-borate, for example, are fed in controlled proportions corresponding to sodium 1,5-borate to a tank 90 in which they are suspended in water to form an aqueous slurry. Constant agitation is provided by suitable means, indicated at 91, so that the added materials are held in suspension. Tank 90 is maintained at a suitable moderately elevated temperature, for example 100°F., at which borax and boric acid are decidedly more soluble than sodium 1,5-borate in solution saturated with respect to the latter. The added borax and boric acid then go into solution rapidly, the granules of those materials disappearing substantially as soon as they are introduced into the tank. That produces a solution appreciably supersaturated with respect to sodium 1,5-borate, causing the latter substance to crystallize out rapidly. Therefore, even when borax and boric acid are added steadily to the tank, the resulting slurry contains substantially no solid material except sodium 1,5-borate. The 1,5-borate is typically recovered continuously in any convenient manner, for example by centrifuging suspension withdrawn from the bottom of the tank, as indicated schematically at 94. The liquors from the centrifuge are typically returned via a storage tank 95 to tank 90, as indicated at 96. The damp crystals of sodium 1,5-borate recovered from the centrifuge are typically supplied directly to a calciner 97, in which any desired fraction of their water of crystallization is removed.

It is preferred to provide the sodium 1,2-borate to tank 90 in the form of calcined borax containing approximately 1 mol of water per mol of sodium 1,2-borate. A source of calcined borax of that type is represented schematically as the bin 92, from which the material is supplied to tank 90 via the metering device 93. The boric acid supply to tank 90 is typically shown as including a bin 88 and metering device 89, the two metering means 89 and 93 being operated under suitable related control, in the manner previously described. An important advantage of supplying the borax in highly calcined form is that the amount of water of hydration carried into tank 90 with the borate and boric acid is substantially equal to the water carried away from the tank as water of crystallization of the sodium 1,5-borate produced. The equation expressing that relation is here written as follows,

$$6H_3BO_3 + Na_2B_4O_7 \cdot H_2O \rightarrow Na_2O \cdot 5B_2O_3 \cdot 10H_2O$$

Accordingly, tank 90 is typically operated continuously in the manner described, producing sodium 1,5-borate crystals in a very convenient and economical manner, without requiring that any of the mother liquor be discarded or that water be evaporated in appreciable quantity.

In the illustrative operation described, the material delivered by calciner 97 is typically calcined sodium 1,5-borate. That material is satisfactory for use as the major component of a highly desirable furnace feed, a suitable amount of another sodium borate being added to it to provide the desired overall molar ratio. As illustratively shown, the output of the calciner is taken to surge bin 98, and is then supplied via metering device 100 to a dry mixer 102. Calcined borax is taken from the same bin 92 that supplies tank 90, and is supplied via a metering device 101 to mixer 102. The ratio of calcined 1,5-borate and calcined borax is controlled to give a mixture having the desired molar ratio, and that mixture is then typically supplied to the furnace, indicated schematically at 82. Alternatively, for example, the molar ratio of the product may be adjusted by adding another borate to the crystalline 1,5-borate before it reaches calciner 97. When that is done, regular crystalline borax can be used instead of calcined borax for adjusting the molar ratio, the mixture of borax and 1,5-borate then being calcined together. That procedure, again, has the advantage already mentioned in another connection that the two components of the mixture are both crystalline in nature, and subject to little or no variation in composition.

The systems illustratively shown in Figs. 4 and 5 for producing suitable feed materials for production of anhydrous crystalline borate, and which utilize sodium 1,5-borate as one ingredient of such feed materials, are usable in part for the production of sodium 1,5-borate for conventional uses as well. Moreover, the particular type of furnace feed that is producible by those systems is also producible by other procedures. For example, sodium 1,5-borate, manufactured in any convenient manner, is typically mixed with a borate having molar ratio less than 4 to produce a composition that has a molar ratio preferably between about 3.7 and 4. Such a mixture comprising crystalline sodium 1,5-borate and borax contains approximately 35% water, which is correspondingly reduced if either or both of the components have been calcined. Whereas a composition of that type is usable directly as furnace feed, it is preferred that the water content be reduced to about 30% or less, yielding a composition that is particularly satisfactory as a furnace feed in accordance with the present invention. It will be understood that many other modifications are possible in the detailed operations that have been described without departing from the true spirit and scope of the invention.

The present application is a continuation in part of our copending patent application of the same title, Serial No. 348,672, filed on April 14, 1953, now abandoned.

We claim:

1. The process for producing a solid, anhydrous, predominantly crystalline sodium borate composition in which the $B_2O_3$ content exceeds 80% by weight and which is appreciably less hygroscopic than anhydrous sodium 1,2-borate, said process comprising the steps of mixing together solid sodium 1,2-borate and solid sodium 1,5-borate in a ratio between about 1.3 and about 1.9 mols sodium 1,5-borate per mol sodium 1,2-borate to form a mixture having an overall molar ratio of $B_2O_3/Na_2O$ less than 4.0 and greater than about 3.7, said sodium borates containing water of hydration, calcining at least one of said sodium borates at a temperature between about 150 and about 600° F. to evaporate water of hydration therefrom, the remaining overall water content of the mixture being more than zero and less than about 30% by weight, moving said partially dehydrated mixture substantially continuously into a furnace to evaporate the remaining water of hydration and to heat the mixture to fusing temperature, thereby producing in said furnace an anhydrous fused melt, removing the fused melt from the furnace and then cooling the fused melt to crystallize a predominant portion thereof.

2. As an article of commerce, a solid, anhydrous, predominantly crystalline sodium borate composition in which the $B_2O_3$ content exceeds 80% by weight and which is appreciably less hygroscopic than anhydrous sodium 1,2-borate, said composition consisting essentially of physically integrated anhydrous crystalline sodium borate and anhydrous amorphous sodium borate, the crystalline fraction exceeding 85% by weight of the entire composition, the molar ratio of $B_2O_3/Na_2O$ having an average value for the entire composition that is less than 4.0 and greater than about 3.7, and said molar ratio for the amorphous fraction of the composition being less than said molar ratio for the crystalline fraction of the composition.

References Cited in the file of this patent

Mellor: "Comprehensive Treatise on Inorganic and Theoretical Chemistry," vol. V (page 7), 1924.
Ponomarev: Z. Anorg. Chem. 89, 383–392 (1914).